(No Model.) 4 Sheets—Sheet 1.
M. B. EATON.
SNOW PLOW.

No. 400,197. Patented Mar. 26, 1889.

Witnesses: Inventor.
N. E. Jones Matthias B. Eaton
J. N. Donham per atty.
 Elgin B. Verrill (No Model.) 4 Sheets—Sheet 2.
M. B. EATON.
SNOW PLOW.
No. 400,197. Patented Mar. 26, 1889.
*Fig.3.* *Fig.4.*
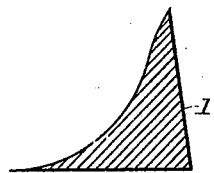
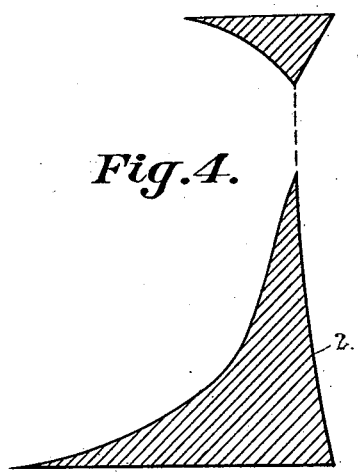
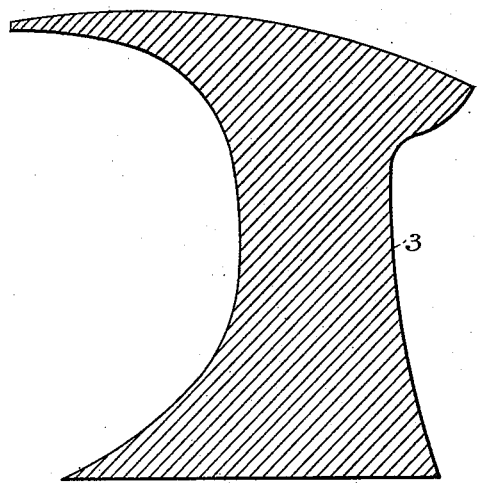
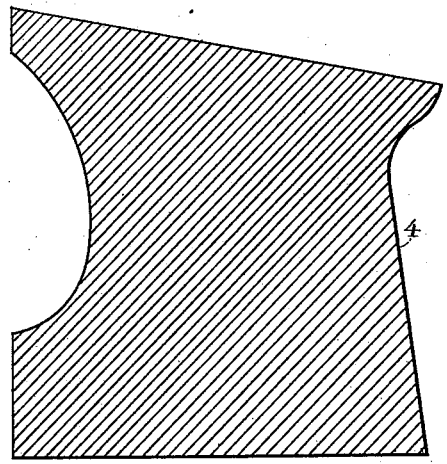
*Fig.5.* *Fig.6.*
Witnesses: Inventor.
A. E. Jones Matthias B. Eaton,
J. N. Donham per atty.
 Elgin C. Verrill.

(No Model.) 4 Sheets—Sheet 3.
M. B. EATON
SNOW PLOW.
No. 400,197. Patented Mar. 26, 1889.
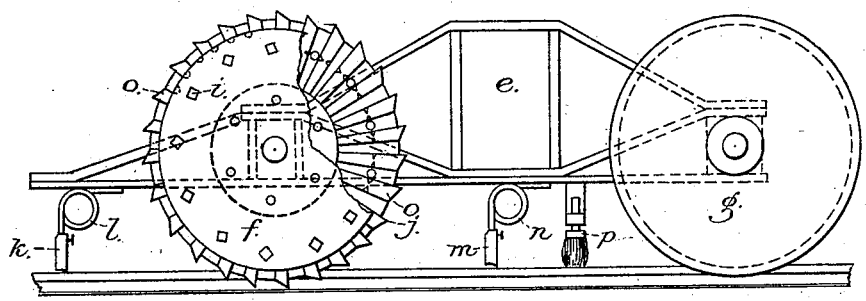
Fig. 7.
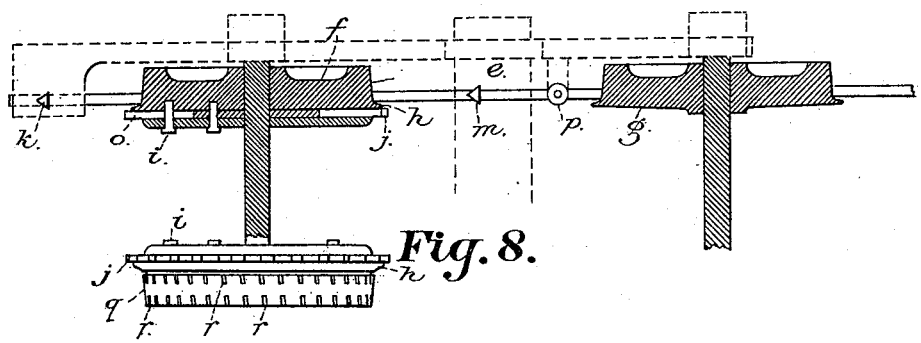
Fig. 8.
Fig. 9. Fig. 10. Fig. 11.
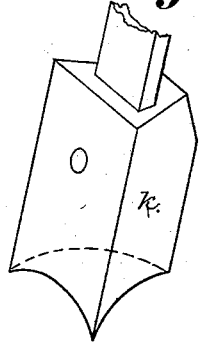
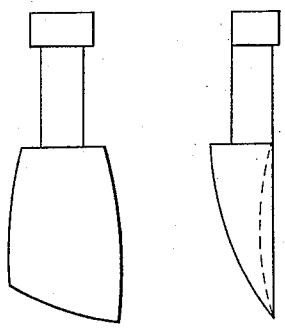
Witnesses:
A. E. Jones
J. N. Denham
Inventor:
Matthias B. Eaton
per atty
Elgin B. Verrill (No Model.)   M. B. EATON.   4 Sheets—Sheet 4.

SNOW PLOW.

No. 400,197.   Patented Mar. 26, 1889.

Witnesses:   Inventor.

UNITED STATES PATENT OFFICE.

MATTHIAS B. EATON, OF BOSTON, MASSACHUSETTS, ASSIGNOR TO WILLIAM W. EATON, OF HARTFORD, CONNECTICUT.

SNOW-PLOW.

SPECIFICATION forming part of Letters Patent No. 400,197, dated March 26, 1889.

Application filed April 4, 1888. Serial No. 269,554. (No model.)

*To all whom it may concern:*

Be it known that I, MATTHIAS B. EATON, of Boston, in the county of Suffolk and State of Massachusetts, have invented certain new and useful Improvements in Snow-Plows; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to snow-plows, and more especially to plows designed to clear snow from railway-tracks and to cut out and clear away ice and snow from the tops and inner sides of the rails.

The invention consists in a one-sided plow to allow snow and ice to be thrown to one side of the track, and having the concave mold-board increasing in concavity from front to rear, forming a ledge or projection for receiving and sustaining a quantity of snow and ice, whereby the necessary rigidity and weight are given to the plow to retain it in place.

Furthermore, the invention consists in a plow to be mounted on suitable trucks and driven in front of an engine, said plow having its sides of peculiar curvature and construction, there being flanged wheels and knives or cutters affixed to the side, drags or little plows attached to the truck-frame in front of and behind the cutter-wheels, a spring-broom behind the rear drags, and a lamp or furnace mounted in the interior cavity of the plow, whereby the mold-board can be warmed to enable it more easily to enter and throw off the snow.

Figure 1:
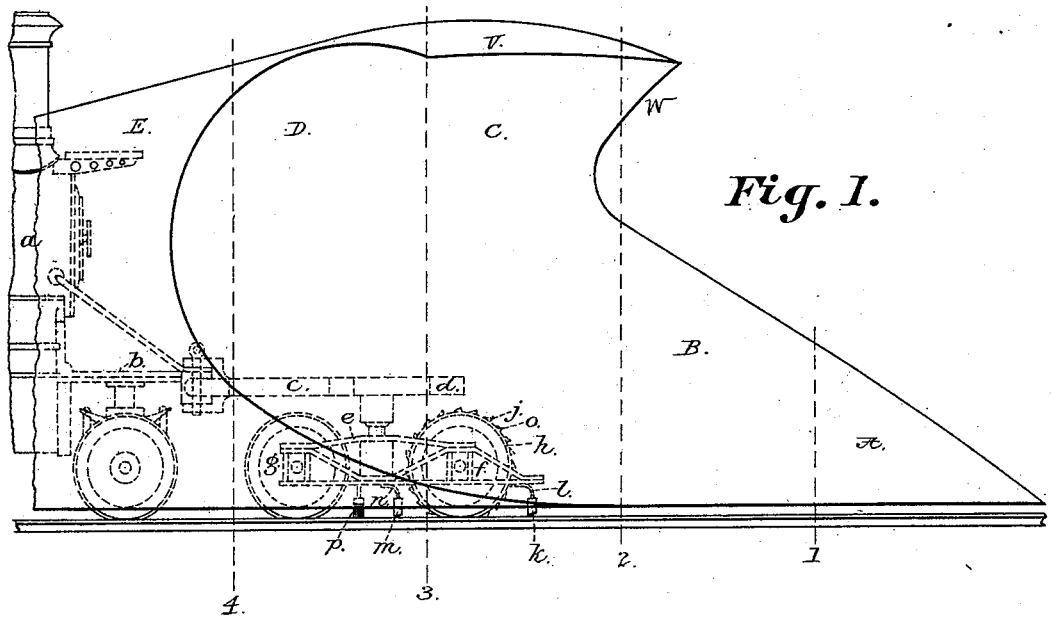
Figure 2:
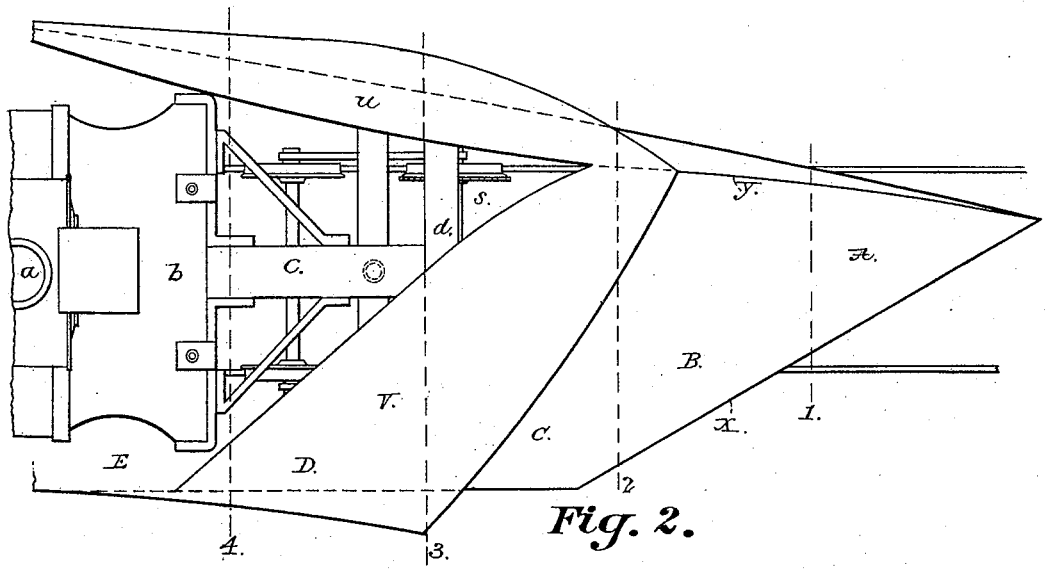
Figure 12:
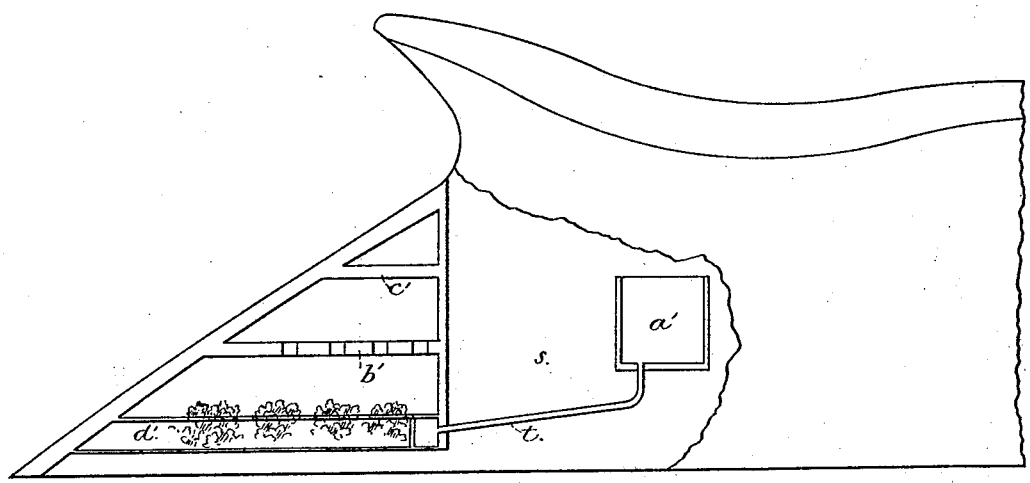
Figure 13:
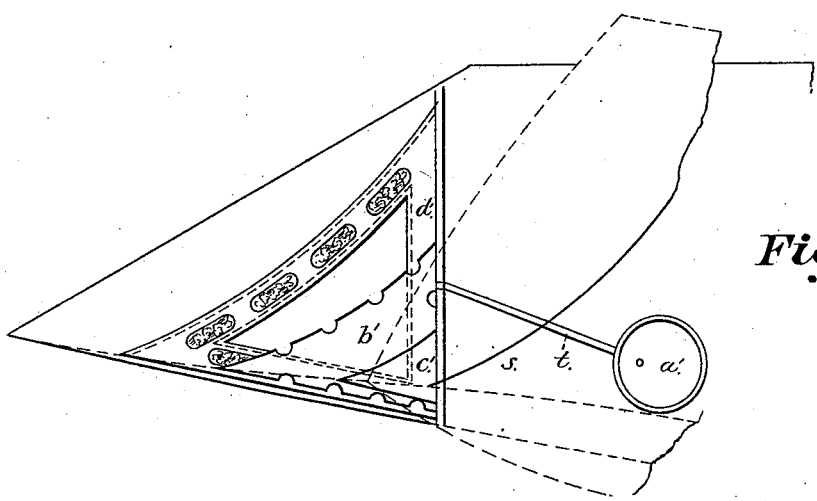

Reference being had to the accompanying drawings, in which same letters and figures refer to like parts for illustration, Figure 1 is a side elevation of the mold-board side of the plow, showing mountings and engine attachment. Fig. 2 is a top plan. Figs. 3, 4, 5, and 6 are sections taken on dotted lines in Fig. 1, numbered, respectively, 1, 2, 3, and 4. Fig. 7 is an elevation of the truck-frame and wheels. Fig. 8 is a horizontal section of wheels with truck-frame dotted. Figs. 9, 10, and 11 are views of different scrapers. Fig. 12 is an elevation, with parts broken out, of the side of the plow opposite the mold-board; and Fig. 13 is a top plan with parts broken out to show the arrangement of the warming apparatus.

The conformation of my improved plow is very important, and is specially designed to reduce to a minimum the loading and blocking tendency of a plow, and, that I may more easily describe these peculiarities of conformation, I divide the plow into vertical sections, indicated by vertical dotted lines in Figs. 1 and 2, which divisions I letter A B C D E, respectively, beginning at the point.

Beginning at the point, the plow on the mold-board side widens out rearward on line $x$ and upward on line $y$, said line $y$ representing the cutter or dividing edge of the plow. Between the lines $x$ and $y$ the side of the plow is concave, the center of concavity lying longitudinally midway, or nearly so, between the said lines $x$ and $y$. The bottom is somewhat flat to admit of its taking on snow enough to cause it to run steadily. This concavity continues gradually growing wider and deeper throughout sections A and B, reaching its greatest width and depth in section C, having changed from a nearly angular shape, as shown in Fig. 3 in section A, to a more regular curve, as seen in Figs. 4 and 5 in sections B and C. From the center of concavity the mold-board extends outward at an easy angle to the line of direction of the truck or of the moving plow to its termination, keeping the same or nearly the same vertical curvature. The line $x$ extends outward at an angle to the line of the track until it reaches a sufficient width, and thence turns and extends parallel with the line of the track beyond the head of the locomotive to the end of the plow. The line $y$ extends from the point upward at an angle to the plane of the bottom of the plow to near the middle of section C, and thence turns and projects forward, as seen at $w$ in Fig. 1. The top of the mold-board extends out over the cavity of said board, as seen at $v$, said projection being concave on its under side, and this curved projection $v$ prevents the snow from getting on top of the plow and from being thrown on the engine. The under side of this projection $v$ follows very nearly the vertical curvature of the mold-board. The opposite side of the plow is slightly inclined upward and inward toward the mold-board side. It may also have a slight vertical curvature. Beginning at the point of the plow, this side extends rearward at a slight angle to the line of direction of the moving plow until the pressure is sufficient to counterbalance the pressure on the mold-board side when greatest. This side also has an overhanging projection, $u$, convex on its under side.

My device is designed to be driven or pushed by means of a locomotive, $a$, from the pilot $b$ of which extends the connecting-rod $c$. This rod is connected with and pushed against a cross-bar, $d$, set in the body of the plow. A part of the weight of the plow resting on the engine-connection imparts a slight vibratory motion to the plow from the engine.

The plow is mounted on a suitable truck-frame, $e$. Journaled in the usual manner in said frame are the forward wheels, $f$, and rear wheels, $g$. The wheels $f$, I will now fully describe. They are so constructed as to cut out the ice and snow on the inside of the rail. They are composed of any ordinary car-wheel having the usual flange, $h$, and a series of knives or cutters, $o$, radially arranged around the inside of the wheels, as shown in Fig. 7. These cutters are held firmly in place by means of a clamp, $i$. As the wheels revolve, each cutter sinks successively into the ice and chips out a small piece as it comes directly beneath and passes under the bearing-points. Each cutter has its outer face inclined and terminating in a thin edge, $j$. In front of the forward wheels of the plow are placed drags $k$, attached to the truck-frame by spring-connection $l$. These project downward till their lower faces nearly touch the top of the rail, as shown in Fig. 7. These are designed to remove from the top of the rail the snow left by the plow, which is raised slightly from the rails.

Behind the front wheels are drags $m$, having connections $n$, similar to the drag in front of said wheels, which remove from the rails coarse ice and snow thrown upon them by the cutters $o$. These drags may take any convenient shape.

Immediately behind the drags $m$ are flexible brush-brooms $p$, attached to the truck-frame. These brooms sweep off from the tops of the rails all fine snow and ice.

In the outer faces of the rim or tires $g$ are cut indentations $r$. These indentations do not extend entirely across the rim, but leave the center perfectly smooth, and these indentations enable the wheels to cut off ice on the rail and to get a firm hold.

Within the plow is a cavity, $s$. Near the bottom and under the mold-board I place a fire-box or lamp, $d'$. This I fill with sand, asbestos, or other material, and wicking is inserted in this receptacle, and communicating with it is a supply-pipe, $t$, leading from an oil-reservoir, $a'$. Nearly midway between the top and bottom of the cavity I place a perforated partition, $b'$, and near the top a solid partition, $c'$, thus forming a chamber into which hot air rises and in which it is confined in order that the plow may be heated and retained in this condition.

The operation of this part of my device is as follows: The heat from the fire warms the mold-board, which in turn melts the snow which comes against it, and thus enables it more easily to penetrate and throw off the snow. When heating apparatus is employed, the sides of the plow must be of metal, and should be of copper or some metal which distributes the heat evenly and readily. When the internal fire is not used, the plow may be made of wood.

Having thus described my invention and its use, I claim—

1. A one-sided snow-plow having its mold-board concave, forming a ledge for receiving and sustaining a quantity of snow or ice to weight the plow in use, and the concave landside, whereby the plow is balanced in use.

2. A one-sided snow-plow having its mold-board concave, forming a ledge for receiving and sustaining a quantity of snow or ice to weight the plow in use, and the overhanging portion and the concave landside, substantially as described.

3. A one-sided snow-plow having its mold-board concave, forming a ledge for receiving and sustaining a quantity of snow and having the overhanging portion, and the concave landside having the overhanging portion.

4. A one-sided railway snow-plow having the point, the concave mold-board increasing in concavity from front to rear and forming the ledge or projection for receiving and sustaining a quantity of snow or ice, whereby the plow is steadied and held in place, and the landside provided with the overhanging portion, substantially as described.

5. A one-sided railway snow-plow having the point, as described, the concave mold-board, the bottom slightly flattened, and the landside extending outward at an angle to the line-draft and inclined from a perpendicular inward, and the rear shields extending beyond the head of the locomotive, substantially as described.

6. The ice breaking and clearing wheel, having the diagonal grooves or indentations at each side extending partly across the tread of the wheel, leaving a portion thereof smooth, substantially as and for the purpose described.

7. The combination, with the wheel having the diagonal grooves or indentations at each side extending partly across the tread of the wheel, leaving a portion thereof smooth, of the ice-cutters, substantially as set forth.

8. The combination, with an ice breaking and clearing wheel having the diagonal grooves or indentations at each side extending partly across the tread of the wheel, leaving a portion thereof smooth, of an ice-cutter and of a spring drag or drags, substantially as described.

9. The combination, with an ice breaking and clearing wheel having the diagonal grooves or indentations at each side extending partly across the tread of the wheel, leaving a portion thereof smooth, of the ice-cutters, of spring drags or scrapers and a brush, substantially as and for the purpose set forth.

10. In a snow-plow, the shoe provided with the burner or heat-generator and with the partitions $c'$ $b'$, the partition $b'$ being perforated, substantially as and for the purpose set forth.

In testimony that I claim the foregoing as my own I affix my signature in presence of two witnesses.

MATTHIAS B. EATON.

Witnesses:
ELGIN C. VERRILL,
WILLIAM HENRY CLIFFORD.